(12) United States Patent
Bates et al.

(10) Patent No.: US 7,080,402 B2
(45) Date of Patent: Jul. 18, 2006

(54) ACCESS TO APPLICATIONS OF AN ELECTRONIC PROCESSING DEVICE SOLELY BASED ON GEOGRAPHIC LOCATION

(75) Inventors: Cary Lee Bates, Rochester, MN (US); Eric John Nelson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 09/804,424

(22) Filed: Mar. 12, 2001

(65) Prior Publication Data

US 2002/0125886 A1    Sep. 12, 2002

(51) Int. Cl.
*H04L 9/32* (2006.01)

(52) U.S. Cl. .......................................... 726/2; 380/258
(58) Field of Classification Search ................ 713/200; 342/357; 455/410, 429, 411; 705/3; 701/200; 235/487, 457; 380/258; 726/2; 709/226, 709/229; 711/170
See application file for complete search history.

(56) References Cited

U.S. PATENT DOCUMENTS

| | | | | |
|---|---|---|---|---|
| 5,223,844 A | * | 6/1993 | Mansell et al. | 342/357.07 |
| 5,731,785 A | | 3/1998 | Lemelson et al. | 342/357 |
| 5,748,084 A | | 5/1998 | Isikoff | 340/568 |
| 5,757,916 A | | 5/1998 | MacDoran et al. | 380/25 |
| 5,778,304 A | * | 7/1998 | Grube et al. | 455/456.4 |
| 5,790,074 A | * | 8/1998 | Rangedahl et al. | 342/357.13 |
| 5,835,881 A | | 11/1998 | Trovato et al. | 701/211 |
| 5,861,841 A | | 1/1999 | Gildea et al. | 342/357 |
| 5,872,557 A | | 2/1999 | Wiemer et al. | 345/156 |
| 5,922,073 A | | 7/1999 | Shimada | 713/200 |
| 6,009,116 A | | 12/1999 | Bednarek et al. | 375/200 |
| 6,154,727 A | * | 11/2000 | Karp et al. | 705/3 |
| 6,275,877 B1 | * | 8/2001 | Duda | 710/23 |
| 6,314,365 B1 | * | 11/2001 | Smith | 701/200 |
| 6,556,819 B1 | * | 4/2003 | Irvin | 455/410 |
| 6,631,271 B1 | * | 10/2003 | Logan | 455/456.1 |

FOREIGN PATENT DOCUMENTS

| | | |
|---|---|---|
| JP | 6301446 | 10/1994 |
| JP | 7128427 | 5/1995 |
| JP | 7248849 | 9/1995 |

\* cited by examiner

*Primary Examiner*—Hosuk Song
*Assistant Examiner*—T. B. Truong
(74) *Attorney, Agent, or Firm*—Karuna Ojanen; Grant A. Johnson

(57) ABSTRACT

Applications/functions within an electronic processing device having a GPS card and antenna, such as a laptop or personal digital assistant, can be enabled only when in a specified geographic location. For each critical application/function, its accessibility is programmed to be enabled/disabled only in specified geographic regions. No additional passwords are required: access or abortion of an running program are automatic. The geographic regions can be input into the electronic processing device using GPS processing or using a graphical user interface on a map. Other methods of determining the boundaries of the appropriate geographic regions for each applications/functions are disclosed. An application/function will not be opened if the electronic device is not within the geographic region associated with the application/function. When an existing application/function is running and the user changes geographic regions, an abort message is automatically generated for those applications/functions that should not be active in the new geographic regions. A GPS card and antenna within the electronic processing device receive and process the device's current location.

14 Claims, 6 Drawing Sheets

ACCESS TO APPLICATIONS OF AN ELECTRONIC PROCESSING DEVICE SOLELY BASED ON GEOGRAPHIC LOCATION

TECHNICAL FIELD

This invention relates generally to the field of accessing particular applications/functions of electronic processing devices and more particularly relates to accessing an application only within an allowed geographic region.

BACKGROUND OF THE INVENTION

People in our society have become increasingly mobile and, not coincidentally, have increasingly come to rely on their electronic devices such as laptop computers, cellular phones, hand-held personal digital assistants, etc. as they travel. These devices, moreover, have become increasingly complex and capable of maintaining a myriad of programs as well as maintaining connections with networks such as the Internet. Telecommuting, i.e., maintaining a business office in a place other than a headquartered office such as one's home and connecting to an employer through a computer or hand-held microprocessing device, occurs across town, across the country, and even across international borders. People demand more of their electronic communication devices too. People want to be able to conduct personal and/or business financial transactions, legal transactions, communications with business associates, employers, employees, family, friends all with one device.

In a perfect world, there would be no need for security of one's information but information has been protected as long as the first secret was spoken; and as long as a person or business entity considers his/her own information confidential. The devices containing the information, moreover, have become subject to thievery irrespective of the information contained therein. So, it is imperative that a person be able to restrict access to information.

There are security systems using the Global Positioning System (GPS) which was designed, funded and operated by the U. S. Department of Defense (DOD) although there are many thousands of civilian uses of GPS world-wide. The nominal GPS Operational Constellation consists of twenty-four satellites that orbit the earth in twelve hours. There are often more than twenty-four operational satellites as new ones are launched to replace older satellites. A satellite orbit repeats almost the same ground track as the earth turns beneath them once each day. A system of tracking stations are located around the world with the Master Control facility at Schriever Air Force Base in Colorado. These monitor stations measure signals from the satellites which are incorporated into orbital models for each satellite which compute precise orbital data and clock corrections for each satellite. The Master Control station uploads the corrected orbital and clock data to the satellites. The satellites then send subsets of the orbital data to GPS receivers via radio signals all over the world. The GPS receiver processes the signals to compute position, velocity and time of the satellite and/or the receiver. Four GPS satellite signals are used to compute positions in three dimensions and the time offset in the receiver clock.

GPS has been used for years in aircraft, ships, etc. but now consumers are using GPS in computers, automobiles, cellular phones, etc. Restricting access to devices has long been accomplished using passwords. One such password system is set forth in U.S. Pat. No. 5,922,073 entitled System and Method for Controlling Access to Subject Data Using Location Data Associated with the Subject Data and a Requesting Device to Shimada. In this system, a user enters a password associated with the data, simultaneously a GPS receiver detects the location and if the location is not the proper location attributed to the data, access is prohibited. The password is not geographic specific; rather it is data specific. In Shimada there is a two-part security: first, a password; and second, a location based on GPS location. U.S. patent application Ser. No. 09/804,358 entitled Password Value Based on Geographic Location, owned by the assignee herein and hereby incorporated in its entirety, is another method of protecting access to an electronic processing device using geographic specific passwords. Again, the user is required to enter a password.

A device and method entitled Automatic laptop reconfiguration based on location of May 1999 uses a GPS tracking chip within a laptop computer which updates the operating system and other non-interactive programs to automatically reconfigure the system clock, time zones, telephone numbers to call for network connections, etc., upon entering different time zones. Access is still allowed, however, to the computer's applications irrespective of location.

Applications or programs having or allowing access to confidential information within an electronic processing device need be enabled only at a place of employment or other specific location. It is preferred or even required, moreover, that access to the data and/or programs not be granted to the device outside of a particular locale. There is thus a need in the industry to restrict access to specific functions within an electronic processing device based on geographic location.

SUMMARY OF THE INVENTION

These needs and others that will become apparent to one skilled in the art are satisfied by an electronic processing device, comprising: a user interface to interact with a user; location detection electronics; processing electronics connected to the user interface and the location detection electronics; memory to store a plurality of functions/applications associated with a plurality of geographic regions, the memory connected to the processing electronics; a gate-keeper to allow access to at least one application/function only when the electronic processing device is within an associated one of the plurality of geographic locations based solely on the associated geographic location.

The invention may also be considered a method to access an application/function in an electronic processing device, comprising the steps of: invoking a user interface of the electronic processing device; entering a description of a first geographic location; associating at least one application/function of the electronic processing device with the first geographic region; enabling a user to access the at least one application/function of the electronic device only when the electronic device is in the first geographic region based solely on whether the electronic processing device is within the geographic region associated with the at least one application/function. Descriptions of geographic regions may be entered in a number ways, such as obtaining the GPS location from GPS processing electronics within the electronic processing device and creating boundaries by extending a selected distance from the GPS location; delineating the boundaries of the first geographic region using a graphical user interface on a map containing the first geographic region; entering the longitude and latitude coordinates of the boundaries of the geographic region; entering a street address associated with a geographic region.

The method may further comprises entering a description of a second geographic region and associating a second application/function with the second geographic region. Priorities may be assigned to each geographic region; as well as to each application/function.

The method further contemplates that the present location of the electronic device may be determined by using GPS signals processed by GPS processing electronics within the electronic device.

The invention may also be considered a method to restrict access to an application/function of an electronic processing device, comprising the steps of: invoking a user interface of the electronic processing device; determining the present location of the electronic processing device; invoking an application/function of the electronic processing device; restricting access to the application/function of the electronic processing device solely because the electronic processing device is not within a geographic region associated with the application/function; and sending a message to abort the application/function whenever the electronic processing device is moved out of the associated geographic region.

In another embodiment of the invention, a method to protect an electronic processing device from unauthorized use is disclosed, comprising the steps of: invoking a user interface of the electronic processing device; entering a description of at least one geographic location by a method selected from the group of methods consisting of: obtaining the GPS location from GPS processing electronics within the electronic processing device and creating boundaries by extending a selected distance from the GPS location, delineating the boundaries of the first geographic region using a graphical user interface on a map containing the first geographic region, entering the longitude and latitude of the boundaries of the geographic region, and entering a street address associated with a geographic region; invoking at least one application/function stored on the electronic processing device; associating each of the at least one application/function with one of the at least one geographic region; determining the present location of the electronic processing device using GPS signals processed by GPS processing electronics within the electronic processing device; assigning priority to the at least one geographic region; allowing the user to use the at least one application/function in the at least one geographic region solely because the at least one geographic region is the geographic region associated with the at least one application/function; indicating that the electronic processing device has moved out of the associated geographic region; and notifying a user that the application/function should be aborted.

The invention is also an article of manufacture, comprising a data storage medium tangibly embodying a program of machine readable instructions executable by an electronic processing apparatus to perform method steps for operating the electronic processing apparatus, the method steps comprising the steps of: storing a plurality of descriptions of geographic regions; storing a plurality of applications/functions, each associated with one or more of the descriptions of geographic regions; assigning a priority to each of the plurality of descriptions of geographic regions; determining the present location of the electronic processing device; and allowing a user to use an application/function of the electronic processing device in the present location solely because the present location is within the description of the geographic region associated with the application/function.

The invention is also a secure electronic processing device, comprising: means to store a plurality of descriptions of geographic locations in which the secure electronic processing device may be used; means to store a plurality of geographic-specific applications/functions, each of the geographic-specific applications/functions associated with at least one of the geographic locations; means to determine the present location of the electronic processing device; means to determine that the present location is one of the geographic locations; means to invoke a geographic-specific application/function; means to allow access to the invoked geographic-specific application/function solely because the present location is one of the geographic locations associated with the invoked application/function. The means to determine that the present location is one of the geographic locations may further comprise a GPS antenna and GPS processing electronics. The secure electronic processing device may further comprise means to abort the invoked application/function solely because the present location is not one of the geographic locations associated with the invoked geographic-specific application/function.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

DETAILED DESCRIPTION OF THE INVENTION

Figure 1:
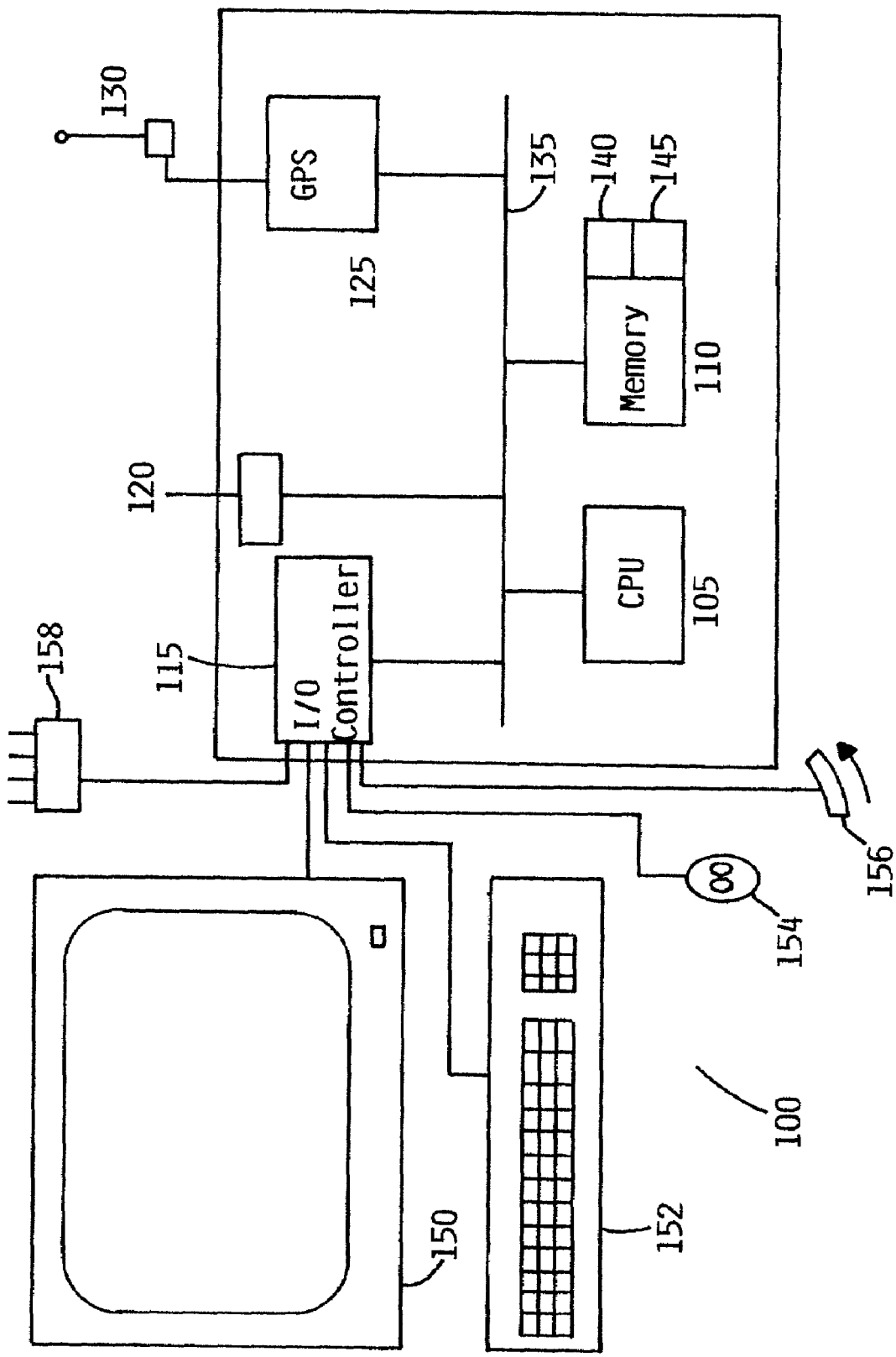
FIG. 1 is a high-level block diagram of an electronic processing device embodied as a computer system capable of implementing the invention.

Referring to the Drawing, wherein like numbers denote like parts throughout the several views, FIG. 1 shows a high-level block diagram of an electronic processing device 100, consistent with the preferred embodiment. Electronic processing device 100 may comprise a central processing unit (CPU) 105, memory 110, I/O controller and interface 115, network and/or Internet interface 120, and geographic processing electronics 125 connected to a receiving antenna 130. Geographic processing electronics 125 and antenna 130 may be integrated as in a GPS PCMCIA card such as that disclosed in U.S. Pat. No. 5,861,841 entitled Compact GPS Receiver/Processor to Gildea et al. The various devices communicate with each other via internal communications bus 135 which supports transfer of data, commands and other information between different devices; while shown in simplified form as a single bus, it is typically structured as multiple buses; and may be arranged in a hierarchical form.

CPU 105 may be a programmable processor, executing instructions stored in memory 110; while a single CPU 105 is shown in FIG. 1, it should be understood that electronic processing systems having multiple CPUs could be used. Memory 110 is a random-access semiconductor memory for storing data and programs; memory is shown conceptually as a single monolithic entity, it being understood that memory may be arranged in a hierarchy of caches and other memory devices. Operating system 140 and applications 145 reside in memory 110. Operating system 140 provides, inter alia, functions, such as device interfaces, management of memory pages, management of multiple tasks, etc. as is known in the art. Applications 145 may include a browser which provides a user-interface to the world wide web through the network/Internet interface 120. Some applications 145 including the browser may be integrated into operating system 140. I/O controller 115 may support the attachment of a single or multiple terminals, and may be implemented as one or multiple electronic circuit cards, adapters, or other units, one of which may be a display adapter to support video display 150, which may be a cathode-ray tube display or a touch panel, although other display technologies may be used. A keyboard/pointer adapter supports keyboard or keypad 152 and pointing device 154 depicted as a mouse, it being understood that other forms of input devices such as a pointing stylus could be used. A storage adapter supports one or more data storage devices 156 which may be rotating magnetic or optical disk drives, although other data storage devices could be used. A printer adapter supports printer and/or other output devices, such as speakers (not shown). Other adapters may support any of a variety of additional devices, such as a communication hub 158, audio devices, etc.

Network/Internet interface 120 provides a physical connection for transmission of data to and from the Internet or any other network, and could use any various available technologies. This interface may comprise a modem connected to a telephone line, through which an Internet access provider or on-line service provider is reached, but increasingly other higher bandwidth interfaces are implemented. For example, electronic processing device 100 may be connected to a local mainframe computer system via a local area network using an Ethernet, Token Ring, or other protocol, the mainframe in turn being connected to the Internet. Alternatively, Internet access may be provided through cable TV, wireless, or other types of connection.

The electronic processing device shown in FIG. 1 is intended to be a simplified representation of a computer system, it being understood that many variations in system configuration are possible in addition to those specifically mentioned here. Electronic processing device 100 need not be a personal computer system such as that depicted in FIG. 1, and it may be a larger computer system, such as another server, or a smaller computer system, such as a notebook or laptop computer. Finally, electronic processing device 100 need not be a computer at all, but may be a simpler appliance-like client devices with less memory. It is fully intended that electronic processing device 100 include any electronic device which may interact through user-interfaces to execute a processing application and to be able to transmit/receive data relating to geographic location, and in response thereto, enable processing within of the electronic processing device. Examples of other intended electronic processing devices 100, which list is not intended to be exhaustive but merely exemplary, include a network terminal or a thin client or other terminal-like devices having smaller memory; voice response units (VRUs); terminals; world wide web browsers; and even pervasive mobile devices, such as personal digital assistants, pagers, and cell-phones.

As will be described in detail below, aspects of the preferred embodiment pertain to specific method steps implementable on an electronic device having a computer processor. In an alternative embodiment, the invention may be implemented as a computer program-product for use with an electronic processing device 100. The programs defining the functions of the preferred embodiment can be delivered to the electronic processing device 100 via a variety of signal-bearing media, which include, but are not limited to information stored on writable or non-writable storage media, e.g., read only memory devices such as magnetic or optical disks readable by a disk drive or floppy disks within a diskette drive or a hard-disk drive; or information conveyed to a computer by a telephone or a cable media network, including wireless communications. Such signal-bearing media, when carrying computer-readable instructions that direct the functions of the present invention, represent alternative embodiments of the present invention.

Figure 2:
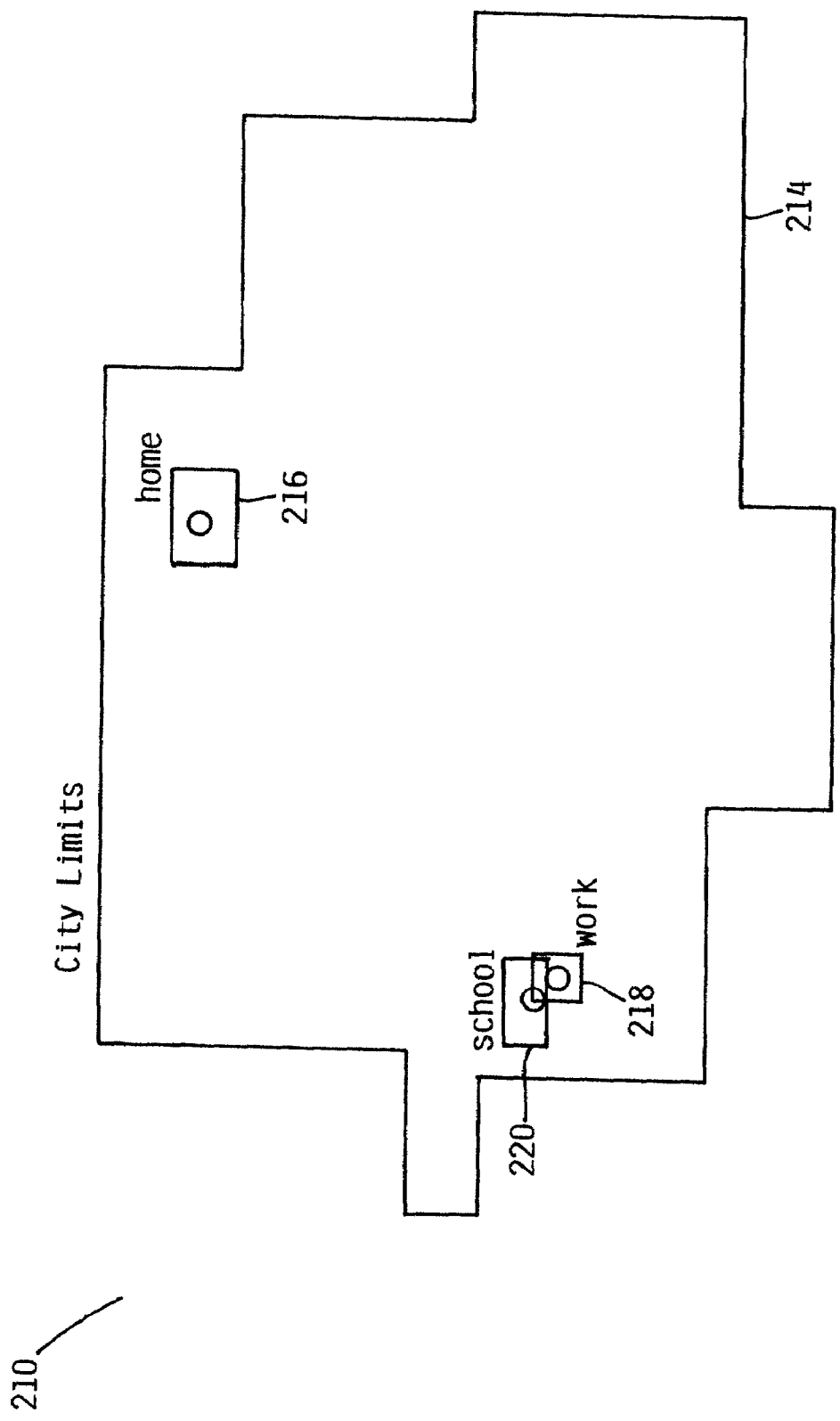
FIG. 2 is an illustration of a graphical user interface of different geographic regions for which different applications/functions may be enabled in accordance with principles of the invention.

Each electronic processing system 100 has the necessary combination of hardware and software to implement a user interface by which a user can interact with the electronic processing device. FIG. 2 is an example of a user interface by which the user can implement the features of the invention to enable an application or function only within a particular geographic region. Given a user interface, such as a map 210 shown on a monitor, for example, a user can move the boundaries of a geographic location or enter the coordinates, either in longitude/latitude or some other x-y or polar coordinate system, of a region for which he/she wishes to enable a specific application/function. Shown in FIG. 2 are four regions: (a) the city limits 214; (b) home 216; (c) work 218; (d) school 220. Given the user interface, the user defines the boundaries of each of these regions, perhaps by entering an address or by moving the arrows or pointers of a graphical user interface, by voice commands, etc. It is an alternative embodiment that the user be able to physically place the electronic device in a geographic region and the GPS processing electronics will automatically set the boundaries of the region if the user indicates that the particular location is intended to be a boundary of the region. In accordance with an embodiment of the invention, the user presents an application/function of the electronic device which can be enabled only within that region.

Figure 3:
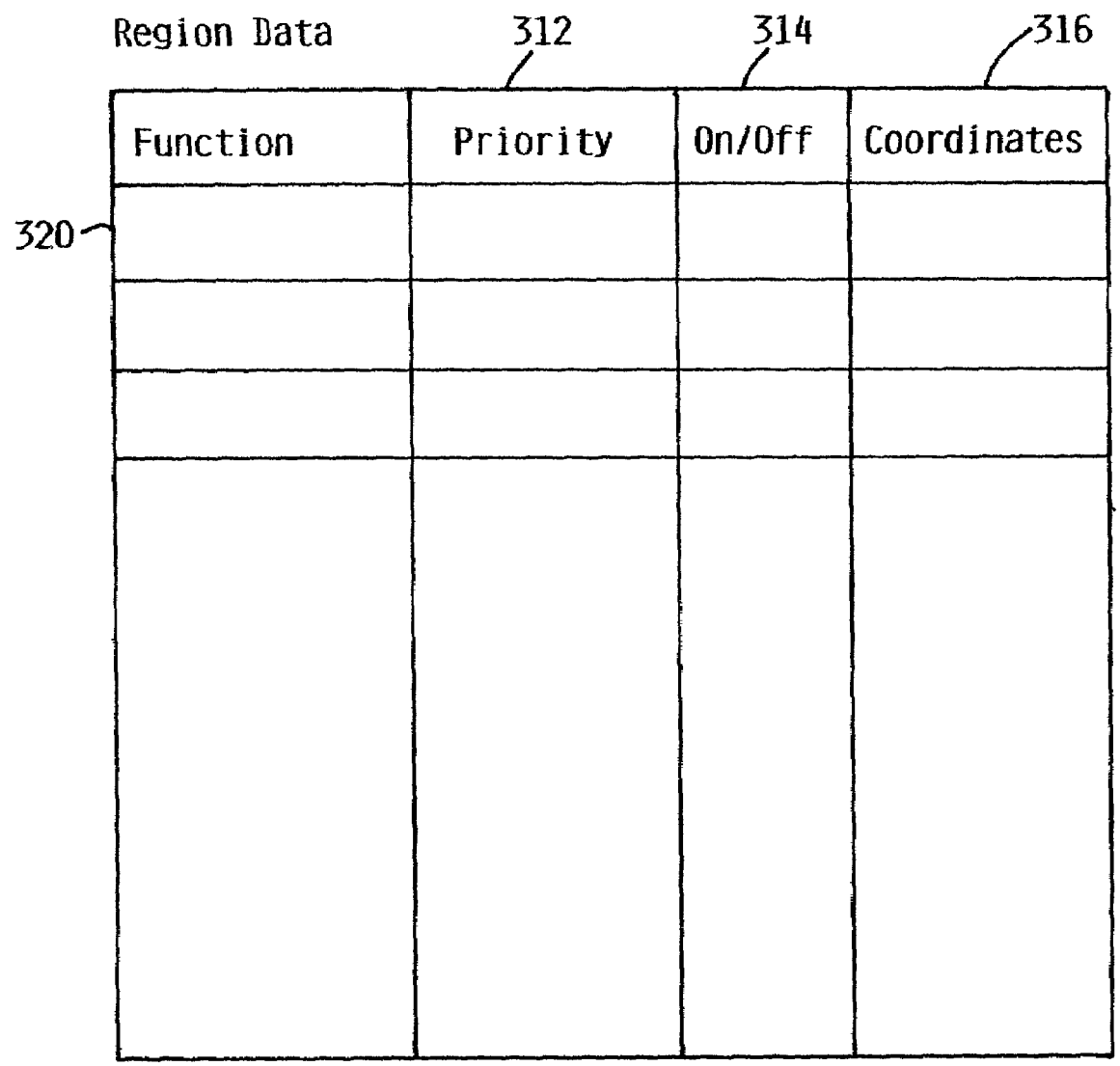
FIG. 3 is a data structure of an application/function particularly associated with its physical location coordinates, an enablement bit, and priority.

FIG. 3 is a table of data records used by the processes of the invention. This data structure 310 of the records 320 can be stored in memory 110 or can be generated immediately upon start up of the electronic processing device. Corresponding to those geographically restrictive applications or functions within the electronic processing device, each represented by a row 320, there is associated a priority field 312, an enablement on/off bit 314, and the location coordinates of the region 316, preferably in signal format for GPS processing although other geographic descriptions may also be used. The priority column 312 is the priority of the geographic region determined by the coordinates 316. Given overlapping regions such as the work and school regions 218, 220 in FIG. 2, the region having the highest priority is the one that determines which applications/functions may be opened in that geographic regions.

Figure 4:
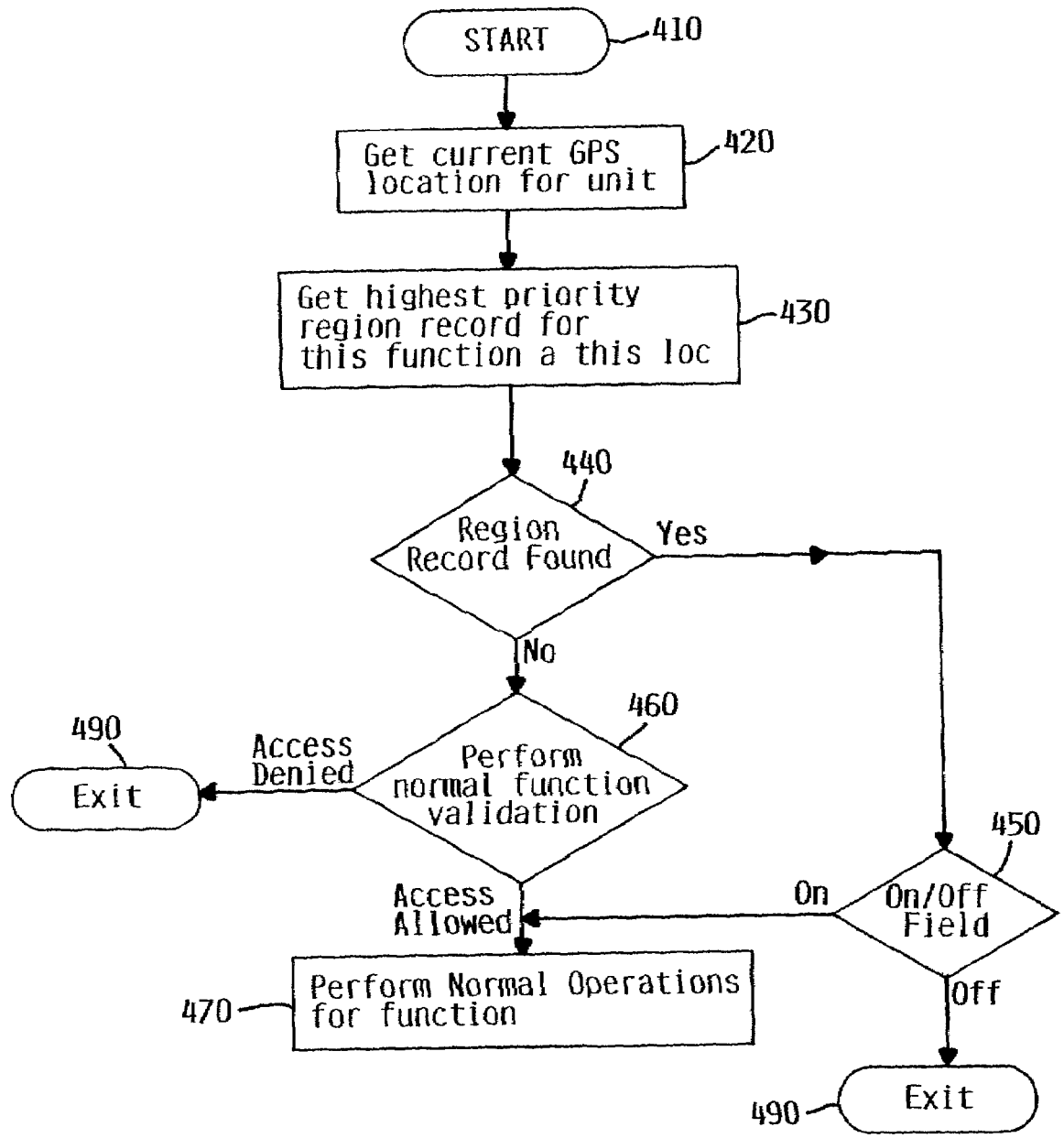
FIG. 4 is a simplified flow chart of how a function or an application within an electronic processing device can be enabled during power-on within a geographic location.

FIG. 4 is a simplified flow chart of the process by which to use the geographic-specific applications/functions in accordance with a preferred embodiment of the invention. In step 410, an electronic device has been started, power-up processing and selection of some application/function occurs. The following method steps also could be implemented upon the invocation of a particular application/function. An application/function herein shall be a series of executable instructions in which a user interacts with the function through a user interface, typically a program requiring input from the user. In any event, in step 420, the geographic location of the electronic processing device is determined, preferably by using the GPS signals received using GPS processing electronics installed in the device. Given a specific location, in step 430 the process continues and retrieves the data record 320 for the highest priority regions associated with the applications/functions enabled at this geographic location. If a data record is found, as in step 440, then in step 450, the enablement on/off bit is interrogated to determine when an application/function is automatically enabled or disabled in the geographic location associated with the current GPS location. If an enablement on/off bit is on, then the function is opened and is able to perform normal operations as in step 470. If the default is that the application/function is normally closed, i.e., the bit is set to "off" then control exits as step 490 without performing the function. If however, no region record is found in step 440, then normal function validation, such as requesting a password, is performed in step 460. If the function has been validated, then access is allowed and normal operations for that function are performed in step 470 again. Otherwise, access to the particular function is denied and the program exits in step 490.

Figure 5:
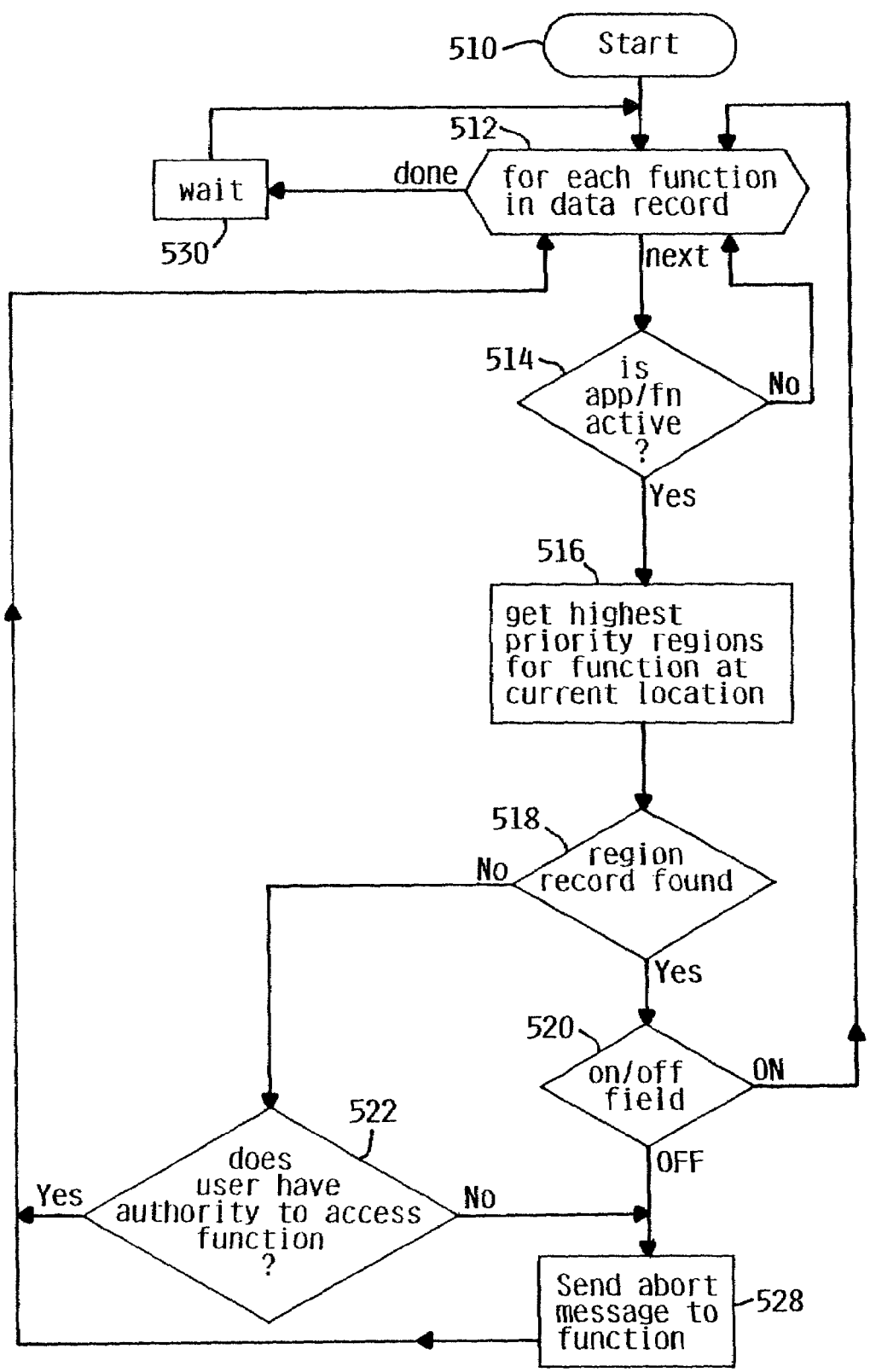
FIG. 5 is a simplified flow chart of processing within an electronic processing device which can be used to disable an active function when the device is moved to another geographic location.

FIG. 5 is a simplified process diagram of a process which occurs in the background processing of the electronic processing device to determine if the electronic processing device has changed locations and, if so, if an application/function should be disabled or aborted because of the change in geographic location in accordance with an embodiment of the invention. Preferably, the process shown in FIG. 5 is run periodically and is transparent to the user; the interval between execution of the steps of FIG. 5 may be determined either by the user, by the operating system, or by the application/functions that are "open". For instance, the process steps of FIG. 5 may run every minute, every five or ten minutes or once an hour, etc. In step 510, the process is initiated and for each application/function for which a data record exists, as in step 512, there is a determination if the application/function is active or open, meaning has it been called and is active in the random access memory, as in step 514. If the application is not open, then the state of next application/function is reviewed. If, however, the application/function is active, then in step 516, the process retrieves the data records for the highest priority regions at its current geographic location. In step 518, the process inquires if a data record is found for the application/function and if so, then in step 520, the process interrogates the enablement bit or on/off field to determine if the application/function is enabled for the current geographic location of the electronic processing device. If so, then normal processing ensues and the process iterates as in step 512. If, however, in step 518, no data record is found for the current geographic location, then the process inquires at step 522 if the user has authority to access the function, regardless of the geographic location. If the user does not have authority to access the function, then an abort message to sent to the function, as in step 528. The application/function may choose to abort immediately and automatically, or may choose to save any data before it aborts, or may simply display the message to the user. The simple purpose of the process steps of FIG. 5 is to determine if the user still has access to continue to utilize those applications/functions that remain open.

Figure 6:
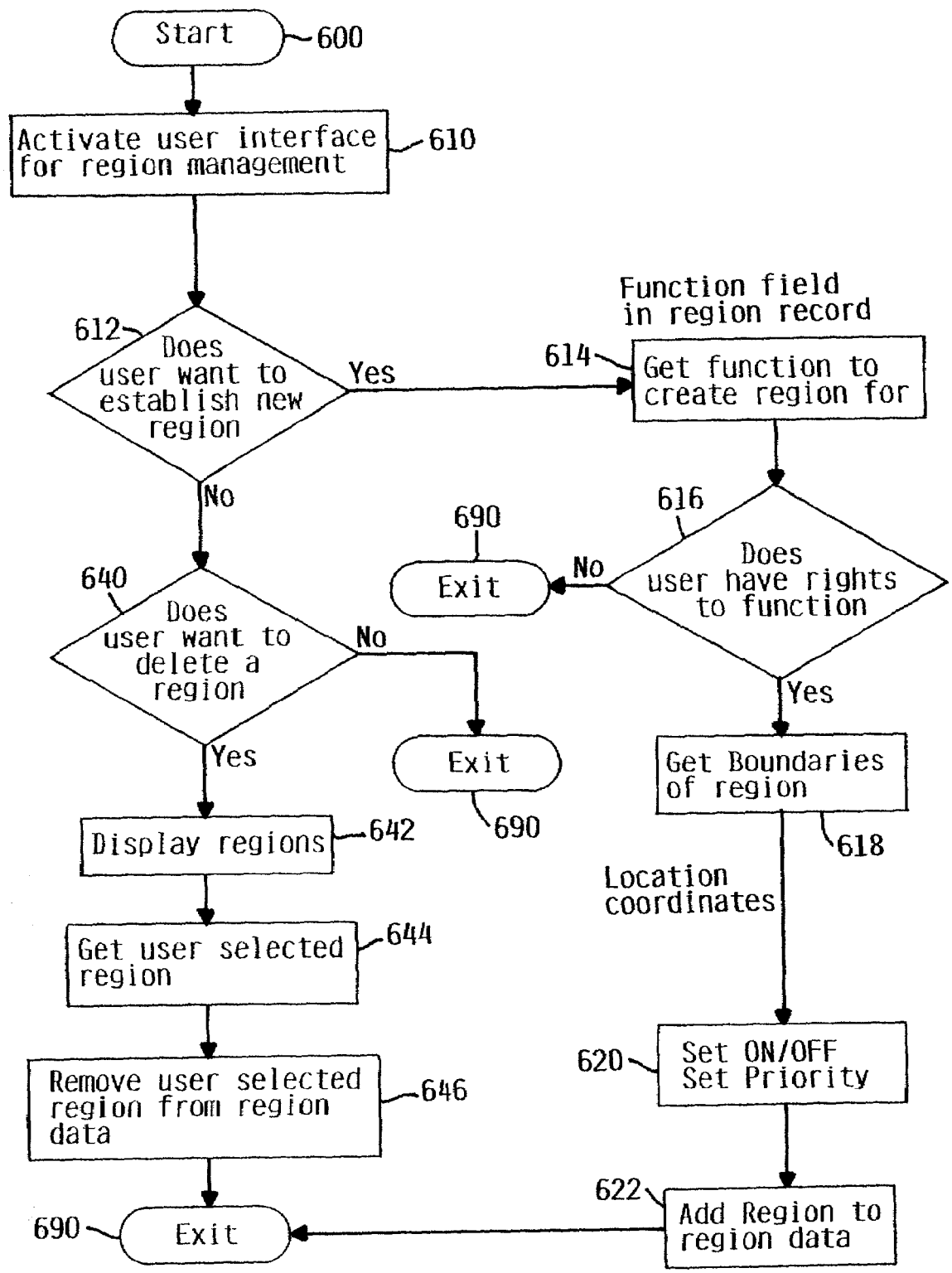
FIG. 6 is a simplified flow chart of processing within an electronic processing device to modify the geographic location pertaining to a particular function within the computer.

FIG. 6 is a simplified process diagram by which a user can program the invention so that applications/functions are enabled or disabled only in specified geographic locations. In step 600, the process is initiated, and in step 610, a user interface is invoked. As discussed, the user interface may be a graphical image or may be written or oral requests so long as a user is able to enter her/his intentions. Given the user interface, the program inquires if the user wishes to create a new region in step 612. If so, then in step 614, the process inquires of the user which applications/functions she/he wishes to enable for a geographic region about to be created. The process determines in step 616 if the user is entitled to access that function/application. If not, the program exits at step 690. If, however and the more interesting case, the user is entitled to access the function/application, the user then enters the boundaries of the geographic region the user wishes to associate with the application/function, preferably using a graphical user interface to draw a polygon circumscribing the region on a map. Otherwise, the user may just verbally speak or use a keyboard/keypad or pointing device to enter the boundaries or the latitude/longitude data, legal description, street address, etc. Still another alternative embodiment if the for the user to physically move the electronic processing device to the boundaries of the region and indicate to the device to automatically set the boundaries using the GPS signal processing within the device.

If by default, the program/application is disabled, the user will be required to set the enablement on/off bit to "off" in step 620. If, on the other hand, a program/application is enabled all the time, then the user will be required to set the enablement on/off bit to "on" in step 620 so that the particular application/function is not accessible in the geographic location. In step 622, the data structure for the particular program/application is updated and stored and the program exits in step 690.

If the user does not wish to establish a new region in step 612, then the user is asked in step 640 if she/he wishes to delete a region. If not, the program exits at step 690. If the user wishes to delete a region, then in step 642, the regions are displayed and the user selects a region in step 644 and removes the selected regions from the data structure pertaining to that particular application/function in step 646. The program then exits in step 690.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. An electronic processing device, comprising:
   (a) a user interface to interact with a user;
   (b) location detection electronics within the electronic processing device;
   (c) processing electronics within the electronic processing device connected to the user interface and the location detection electronics;

(d) memory to store a plurality of functions/applications, and at least one geographic location in which at least one function/application is enabled, and an enablement bit to enable the at least one function/application in the geographic location, the memory within the electronic processing device and connected to the processing electronics; and (e) a verifier to periodically determine that the electronic processing device is still within the geographic region while the at least one function/application is enabled, and if not, to disable the at least one function/application.

2. A method to access an application/function in an electronic processing device, comprising the steps of:

(a) invoking a user interface of the electronic processing device;

(b) obtaining the GPS location from GPS processing electronics within the electronic processing device of a first geographic location and creating boundaries by extending a selected distance from the GPS location to derive a first geographic region;

(c) associating at least one application/function of the electronic processing device with the first geographic region;

(d) enabling a user to access the at least one application/function of the electronic device only when the electronic device is in the first geographic region based solely on whether the electronic processing device is within the geographic region associated with the at least one application/function by determining the present location of the electronic device using GPS signals processed by GPS processing electronics within the electronic device, and enabling the electronic device based on an enablement bit within the electronic device;

(e) periodically confirming that the electronic device is still within the first geographic region while the at least one application/function is enabled; and (f) disabling the at least one application/function when the electronic device is moved out of the first geographic region while the at least one application/function is enable.

3. The method of claim 2, wherein the step of entering a description of a first geographic region further comprises:

(a) delineating the boundaries of the first geographic region using a graphical user interface on a map containing the first geographic region.

4. The method of claim 2, wherein the step of entering a description of a first geographic region further comprises entering the longitude and latitude coordinates of the boundaries of the geographic region.

5. The method of claim 2, wherein the step of entering a description of a first geographic region further comprises entering a street address associated with a geographic region.

6. The method of claim 2, further comprising:

(a) entering a description of a second geographic region;

(b) associating a second application/function with the second geographic region.

7. The method of claim 6, further comprising:

(a) assigning a priority to the first and second geographic region.

8. The method of claim 6, further comprising:

(a) assigning a priority to the first and second application/function.

9. A method to restrict access to an application/function of an electronic processing device, comprising the steps of:

(a) invoking a user interface of the electronic processing device;

(b) determining the present location of the electronic processing device;

(c) invoking an application/function of the electronic processing device;

(d) enabling the application/function of the electronic processing device by determining that an enablement bit in memory of the electronic processing device is enabled within the present location of the electronic processing device; and (e) sending a message to abort the enabled application/function whenever the electronic processing device is moved out of present location.

10. A method to protect an electronic processing device from unauthorized use, comprising the steps of:

(a) invoking a user interface of the electronic processing device;

(b) entering a description of at least one geographic location by a method selected from the group of methods consisting of: obtaining the GPS location from GPS processing electronics within the electronic processing device and creating boundaries by extending a selected distance from the GPS location, delineating the boundaries of the first geographic region using a graphical user interface on a map containing the first geographic region, entering the longitude and latitude of the boundaries of the geographic region, and entering a street address associated with a geographic region;

(c) invoking at least one application/function stored on the electronic processing device;

(d) associating each of the at least one application/function with one of the at least one geographic region by enabling a bit in memory of the electronic processing device which indicates that the at least one application/function can be enabled with the at least one geographic region;

(e) determining the present location of the electronic processing device using GPS signals processed by GPS processing electronics within the electronic processing device;

(f) assigning priority to the at least one geographic region;

(g) allowing the user to use the at least one application/function in the at least one geographic region solely because the at least one geographic region is the geographic region associated with the at least one application/function;

(h) indicating that the electronic processing device has moved out of the associated geographic region; and (i) notifying a user that the at least one application/function should be aborted.

11. An article of manufacture, comprising a data storage medium tangibly embodying a program of machine readable instructions executable by an electronic processing apparatus to perform method steps for operating the electronic processing apparatus, said method steps comprising the steps of:

(a) storing a plurality of descriptions of geographic regions in memory of an electronic processing apparatus;

(b) storing a plurality of applications/functions in memory of an electronic processing apparatus, each associated with one or more of the descriptions of geographic regions by storing an enablement bit in memory of the electronic processing apparatus for one of the plurality of applications/functions for one or more of the descriptions of geographic regions;
(c) assigning a priority to each of the plurality of descriptions of geographic regions;
(d) determining and periodically updating the present location of the electronic processing device; and
(e) allowing a user to use an application/function of the electronic processing device in the present location solely because the present location is within the description of the geographic region associated with the application/function of the electronic processing device.

12. A secure electronic processing device, comprising:
(a) means within the secure electronic processing device to store a plurality of descriptions of geographic locations in which said secure electronic processing device may be used;
(b) means within the secure electronic processing device to store a plurality of geographic-specific applications/functions;
(c) means within the secure electronic processing device to store a plurality of enablement bits, each of the enablement bits enables on of the plurality of geographic-specific applications/functions in at least one of the plurality of descriptions of geographic locations;
(d) means within the secure electronic processing device to periodcally determine that present location of said electronic processing device;
(e) means within the secure electronic processing device to determine that said present location is one of said geographic locations;
(f) means within the secure electronic processing device to invoke a geographic-specific application/function;
(g) means within the secure electronic processing device to allow access to the invoked geographic-specific application/function because the present location is one of said geographic locations associated and the invoked geographic-specific application/function has an enablement bit on.

13. The secure electronic processing device of claim 12, wherein the means to determine that said present location is one of said geographic locations further comprises a GPS antenna and GPS processing electronics.

14. The secure electronic processing device of claim 13, further comprising means to abort the invoked geographic-specific application/function solely because the present location is not one of said geographic locations associated with the invoked geographic-specific application/function.

* * * * *